(12) United States Patent
Falcon

(10) Patent No.: US 8,856,816 B2
(45) Date of Patent: Oct. 7, 2014

(54) AUDIENCE MEASUREMENT SYSTEMS, METHODS AND APPARATUS

(75) Inventor: Fernando D. Falcon, Milan (IT)

(73) Assignee: The Nielsen Company (US), LLC, Schaumburg, IL (US)

( * ) Notice: Subject to any disclaimer, the term of this patent is extended or adjusted under 35 U.S.C. 154(b) by 367 days.

(21) Appl. No.: 12/905,798

(22) Filed: Oct. 15, 2010

(65) Prior Publication Data

US 2011/0093878 A1 Apr. 21, 2011

(30) Foreign Application Priority Data

Oct. 16, 2009 (GB) .................................. 0918239.5

(51) Int. Cl.
| | | |
|---|---|---|
| *H04H 60/32* | (2008.01) | |
| *H04H 60/33* | (2008.01) | |
| *H04H 60/45* | (2008.01) | |
| *H04H 60/56* | (2008.01) | |
| *G06Q 30/02* | (2012.01) | |
| *H04H 60/58* | (2008.01) | |
| *H04H 60/37* | (2008.01) | |
| *H04N 21/442* | (2011.01) | |
| *H04H 60/29* | (2008.01) | |
| *H04L 29/08* | (2006.01) | |

(52) U.S. Cl.
CPC ............... *H04H 60/33* (2013.01); *H04H 60/37* (2013.01); *H04H 60/56* (2013.01); *H04N 21/442* (2013.01); *G06Q 30/02* (2013.01); *H04N 21/44222* (2013.01); *H04N 21/44213* (2013.01); *H04H 60/29* (2013.01); *H04L 29/08675* (2013.01); *H04H 60/58* (2013.01)
USPC ........ 725/14; 725/9; 725/15; 725/16; 725/17; 725/18

(58) Field of Classification Search
CPC ....... H04H 60/29; H04H 60/33; H04H 60/37; H04H 60/56; H04L 29/08675; H04N 21/442; H04N 21/44213; H04N 21/44222
See application file for complete search history.

(56) References Cited

U.S. PATENT DOCUMENTS

| | | |
|---|---|---|
| 4,025,851 A | 5/1977 | Haselwood et al. |
| 4,658,290 A | 4/1987 | McKenna et al. |

(Continued)

FOREIGN PATENT DOCUMENTS

| | | |
|---|---|---|
| DE | 19626907 | 1/1998 |
| EP | 1318679 | 11/2003 |

(Continued)

OTHER PUBLICATIONS

GFK Telecontrol AG, "Product Brochure," Telecontrol VIII Standard, Switzerland, 17 pages.

(Continued)

*Primary Examiner* — Nathan Flynn
*Assistant Examiner* — James R Marandi
(74) *Attorney, Agent, or Firm* — Hanley, Flight & Zimmerman, LLC

(57) ABSTRACT

Methods, apparatus, systems and articles of manufacture to determine source information for media content output by a media rendering device operable to output media content from a plurality of different sources are disclosed. An example method disclosed herein comprises detecting media content output by the a media rendering device, the media content having a media variable associated therewith, detecting a plurality of user commands, detecting a change in the media variable associated with the media content output by the media rendering device, selecting, based on a time limit, a user command from the plurality of detected user commands to use with the detected media variable change to determine source information, and providing the detected media variable change and the selected user command to a processor to determine a source of the media content output by the media rendering device.

19 Claims, 16 Drawing Sheets

(56) References Cited

U.S. PATENT DOCUMENTS

| | | | |
|---|---|---|---|
| 4,677,466 | A | 6/1987 | Lert, Jr. et al. |
| 4,697,209 | A | 9/1987 | Kiewit et al. |
| 4,718,106 | A | 1/1988 | Weinblatt |
| 4,807,031 | A | 2/1989 | Broughton et al. |
| 4,858,000 | A | 8/1989 | Lu |
| 4,876,736 | A | 10/1989 | Kiewit |
| 4,905,080 | A | 2/1990 | Watanabe et al. |
| 4,907,079 | A | 3/1990 | Turner et al. |
| 4,930,011 | A | 5/1990 | Kiewit |
| 4,945,412 | A | 7/1990 | Kramer |
| 4,972,503 | A | 11/1990 | Zurlinden |
| 5,031,228 | A | 7/1991 | Lu |
| 5,224,150 | A | 6/1993 | Neustein |
| 5,235,414 | A | 8/1993 | Cohen |
| 5,373,315 | A | 12/1994 | Dufresne et al. |
| 5,374,951 | A | 12/1994 | Welsh |
| 5,425,100 | A | 6/1995 | Thomas et al. |
| 5,481,294 | A | 1/1996 | Thomas et al. |
| 5,483,276 | A | 1/1996 | Brooks et al. |
| 5,526,427 | A | 6/1996 | Thomas et al. |
| 5,532,732 | A | 7/1996 | Yuen et al. |
| 5,550,928 | A | 8/1996 | Lu et al. |
| 5,585,865 | A | 12/1996 | Amano et al. |
| 5,732,112 | A | 3/1998 | Langberg |
| 5,752,159 | A | 5/1998 | Faust et al. |
| 5,798,785 | A | 8/1998 | Hendricks et al. |
| 6,647,548 | B1 | 11/2003 | Lu et al. |
| 7,647,605 | B2 | 1/2010 | Lu et al. |
| 2004/0058675 | A1 | 3/2004 | Lu et al. |
| 2007/0192782 | A1* | 8/2007 | Ramaswamy .................... 725/9 |

FOREIGN PATENT DOCUMENTS

| | | |
|---|---|---|
| WO | 9417609 | 8/1994 |
| WO | 9512278 | 5/1995 |
| WO | 0079709 | 6/2000 |
| WO | 0070869 | 11/2000 |

OTHER PUBLICATIONS

Office Action, mailed Jun. 14, 2000, Australian Application No. 40702/97, 2 pages.
Claims as allowed by allowance of Jun. 14, 2000, mailed May 16, 2000, Australian Application No. 40702/97, 17 pages.
Notice of Allowance, mailed Sep. 12, 2009, Chinese Application No. 97197720.8, 4 pages.
English Translation of Notice of Allowance, mailed Sep. 12, 2009, Chinese Application No. 97197720.8, 2 pages.
Second Office Action, mailed Apr. 11, 2003, Chinese Application No. 97197720.8, 3 pages.
English Translation of Second Office Action, mailed Apr. 11, 2003, Chinese Application No. 97197720.8, 5 pages.
First Office Action, mailed Jul. 12, 2002, Chinese Application No. 97197720.8, 3 pages.
English Translation of First Office Action, mailed Jul. 12, 2002, Chinese Application No. 971197720.8, 2 pages.
Communication from Examiner, mailed Mar. 12, 2004, European Application No. 97938348.6, 2 pages.
Office Action, mailed Mar. 21, 2003, European Application No. 97938348.6-2412, 2 pages.
Intellectual Property Office, "International Search Report," dated Jan. 19, 2010 for corresponding GB Application No. GB0918239.5, 3 pages.
Correspondence from Attorneys Regarding First Office Action, mailed Jun. 11, 2004, Mexican Application No. 9902112, 1 page.
Office Action, mailed Aug. 22, 2007, U.S. Appl. No. 10/667,992, 16 pages.
Office Action, mailed Dec. 9, 2009, U.S. Appl. No. 12/035,853, 4 pages.
Notice of Allowance, mailed Aug. 21, 2009, U.S. Appl. No. 12/035,853, 7 pages.
Notice of Allowance, mailed Jun. 17, 2003, U.S. Appl. No. 08/709,180, 7 pages.
Office Action, mailed Jan. 2, 2003, U.S. Appl. No. 08/709,180, 6 pages.
Office Action, mailed Apr. 12, 2002, U.S. Appl. No. 08/709,180, 5 pages.
Office Action, mailed Sep. 26, 2001, U.S. Appl. No. 08/709,180, 20 pages.
International Searching Authority, "International Search Report," dated Apr. 21, 1998 for corresponding PCT Application No. PCT/US97/14422, 7 pages.
International Preliminary Examining Authority, "Written Opinion," dated Jun. 16, 1998 for corresponding PCT Application No. PCT/US97/14422, 8 pages.
International Preliminary Examining Authority, "Written Opinion," dated Nov. 9, 1998 for corresponding PCT Application No. PCT/US97/14422, 5 pages.
International Preliminary Examining Authority, for PCT/US97/14422, mailed Dec. 18, 1998, 23 pages.

* cited by examiner

| Time Stamp | Key | Device |
|---|---|---|
| 12:33:24 | Program Up | TV Set |
| 12:35:02 | Program Down | TV Set |
| 12:38:33 | Source Select | TV Set |
| 12:38:34 | Arrow Down | TV Set |
| 12:38:34 | Arrow Down | TV Set |
| 12:38:35 | Arrow Down | TV Set |
| 12:38:35 | Enter | TV Set |
| 12:39:46 | Rewind | DVDRecorder |
| 12:39:55 | Stop | DVDRecorder |
| 12:40:22 | Rewind | DVDRecorder |
| 12:40:38 | Stop | DVDRecorder |
| 12:42:54 | Program Up | TV Set |
| 12:43:12 | Program Down | TV Set |
| 12:43:19 | Program Down | DTT Decoder |
| 12:44:37 | Program Down | DTT Decoder |

AUDIENCE MEASUREMENT SYSTEMS, METHODS AND APPARATUS

FIELD OF THE DISCLOSURE

This disclosure relates to audience measurement systems, methods, apparatus and articles of manufacture for measuring the audience of media presentations and, for example, measuring audiences of television programs that may be broadcast through different distribution mechanisms.

BACKGROUND

Apparatus for measuring the audience of a media presentation, such as a television program, are well-known in the industry. Knowledge of the size and composition of audiences to a television or radio broadcast is of paramount importance for the whole broadcast industry in order to get a clear idea of media consumer patterns, for use for example to rate the advertising space included in broadcasts.

Knowledge of the demographical composition of the audience is important for advertisers to optimize the effectiveness of their commercial messages by targeting the right groups for their products. It is also useful for program scheduling purposes for broadcasters.

In order to collect such information, usually a plurality of media consumers is enlisted for cooperating in an audience measurement survey for a predefined length of time. The group of viewers cooperating in the survey is called a panel, while each viewer participating in the panel is called a panel member.

Audience metering apparatus are then coupled to the media rendering devices of various types or display systems (hereinafter referred to as television sets or TV sets by way of example) used by panel members for watching television broadcasts at their respective viewing locations. Such metering apparatus (hereinafter referred to as meters) usually have at least two main goals: (a) determining the content choices made by consumers; and (b) registering the presence of one or more panel members (so that the exposure to the content can be accounted to produce audience data).

Knowledge of the distribution platform or peripheral device from which users make their media choices is also of critical importance to understand the way consumers interact with their TV devices and for advertisers to optimize the allocation of advertising space among the available platforms. Information about platform and/or device usage is deemed essential information by many markets around the world, and will be referred to herein as source information.

Audience metering apparatus have traditionally taken the form of a set-top box to be placed on top of or close to the monitored TV set or other media presentation device and wired to it and to all peripheral devices associated therewith. The data generated by such wired audience metering systems is usually deemed accurate and complete. In some variants of audience measurement solutions, viewers are required to identify themselves by declaring their presence in front of the monitored TV set, usually by pressing an identification key on a remote control to produce presence information (a concept known as a people meter system). A display is generally used to communicate different types of messages to the panel members, the most important one being the acknowledgement that the declaration procedure has been successfully completed.

In FIG. 1 an example is given of a typical prior art set-top metering device that is wire connected to a TV set under measurement.

Several detection methods have been used or attempted for electronic measurement of audiences, some based on indirect inference of the content by measuring a physical variable associated with it using wire connected set-top boxes, for example, measuring the frequency of an analog tuner to deduce the identity of a TV signal. Others are based on information directly associated with the content, for example, reading ancillary codes or correlating signatures produced from the broadcast signal.

Most conventional meters use a plurality of methods to cover as many measurement cases as possible. For example, a meter may use frequency measurement for signal identification in certain analog platforms, while using video matching techniques for other digital platforms where frequency reading alone cannot identify the signal chosen. In such cases, the available methods are switched in or out by the meter or system software according to the active device, i.e. what media distribution platform is in use at any given time. The detection methods may be active all the time. However, the meter must decide when such information is relevant and therefore should be logged. For example, in a given monitored TV setup, a frequency measurement probe may give an indication as long as the measured device is turned on (since the tuner's oscillator is always active), although that platform may not be in use most of the time; therefore the frequency indication must be qualified by source information in order to become meaningful.

The TARIS 5000 meter used by TNS is an example of a multi-method meter that uses a plurality of content determination techniques, each of them applicable in different situations. In summary, the TARIS 5000 meter uses audio-matching for signal identification. It makes particular use of enhanced audio matching (EAM) wherein station recognition is performed based on the soundtrack accompanying an image displayed on a television screen at a given time. In order to achieve this, all potential audio sources for the television set or other device being monitored must be connected to the TARIS 5000 meter. This involves the use of multiple output cables between peripheral devices, the television set, and the meter device itself via an audio breakout box (ABB) which is responsible for identifying the source of an audio signal and transmitting such information to the TARIS 5000 meter.

Known metering devices that make use of a plurality of different methods for signal identification need to determine first the source of the signal, as explained in the SKO document referenced above, so that the metering device can determine which method should be used in each case. Therefore, most prior art metering systems that report platform information are based on a two phase process by which the source or platform in use of the signal is identified as a first phase, so that then one or more of the available signal identification methods can be used in a second phase according to the source determined in the first phase. In some cases one method alone may be used to obtain both types of information, e.g. using different ancillary codes for identical signals transmitted through different broadcast platforms or belonging to different regions. However, such approaches require the application of the different ancillary codes at the source of the broadcast transmission. Therefore, these single method prior art metering systems are not universally applicable for a range of broadcast devices and platforms. It follows that, according to most known-prior art metering systems, several signal identification methods need to be applied simultaneously in order to cover a variety of measurement cases, forcing the metering system to include a plurality of detection methods, increasing the probability of errors, malfunctions, and failures.

An example of an audience metering system that applies several different signal identification methods, and which is currently being used in many countries, is the TVM5 system, produced by AGB NMR Lab (see e.g., www.agblab.com).

In summary, the TVM 5 system can be used to monitor TV audiences of both analog and digital broadcasts. Furthermore, it contains features for measuring a plurality of different TV platforms and devices, to account for the new ways in which TV is being watched. In operation, the device can identify the active source on the screen using any of the magnetic field, electric field and the audio for analysis. The TVM 5 uses a total of seven methods to identify the channel being watched and/or the state or mode of peripheral devices to be measured in association with the TV. The channel identification process is performed in two phases, initially identifying the source of the transmission and then identifying the actual broadcast.

Yet another example of contemporary audience metering systems is the Telecontrol VIII produced by the Telecontrol Group. The Telecontrol VIII meter applies several different measuring methods dependent on the reception technology and particular equipment being used for any given household in which the audience measurement is being carried out. The Telecontrol VIII meter again needs to determine the source information though wired apparatus before it can decide how to identify the channel, or actual signal content.

Still another example of a metering system that requires wiring all peripherals to the metering device is the set-top version of the current UNITAM system (see e.g., www.unitam.tv). The UNITAM meter device includes several audio ports that must be connected to various media devices associated to the TV set under measurement. The UNITAM meter determines source information by comparing the signal received by its audio sensor with each of the signals available at the audio ports received through respective wires to determine the platform in use.

The UNITAM meter device has several ports to which media devices such as a DVD player, freeview box, digital or cable TV box, games console, or other media devices possibly associated with a TV set can be connected. During use, the meter detects the port from which the signal on the TV at any given time is coming from and begins to generate audio signatures from that port continuously as long as it remains active. When the current port becomes inactive, the UNITAM meter device must detect the port from which the signal is now being transmitted and begin to generate a different audio signature from that port continuously for as long as it remains active. These signatures are then processed in order to identify all the content shown on the associated TV set or display as coming from a particular platform or source. The UNITAM meter uses infrared logging as an auxiliary method for overcoming problems of simulcasting, wherein two or more TV stations transmit the same content at the same time.

It can thus be understood that many known metering concepts rely on wired connections between the TV set, one or more peripheral devices and the metering device in order to generate source information. This need for wired connection between several devices in metering device systems derives from the prior art approaches of identifying the source of a particular media broadcast and then deciding, based on that source information, what particular content identification method should be applied to identify the broadcast itself. The source and broadcast identification method used may include applying a code or tab to the broadcast transmission at the metering device via the wired connections to identify the different respective broadcast source devices. Thus known metering concepts are generally technically complex and, in some cases, require application of several different identification methods dependent on the source of a broadcast at any given time.

BRIEF DESCRIPTION OF THE DRAWINGS

FIG. 6 shows a list of possible user commands detectable by the user command identification mechanism according to FIG. 5.

DETAILED DESCRIPTION

Figure 1:
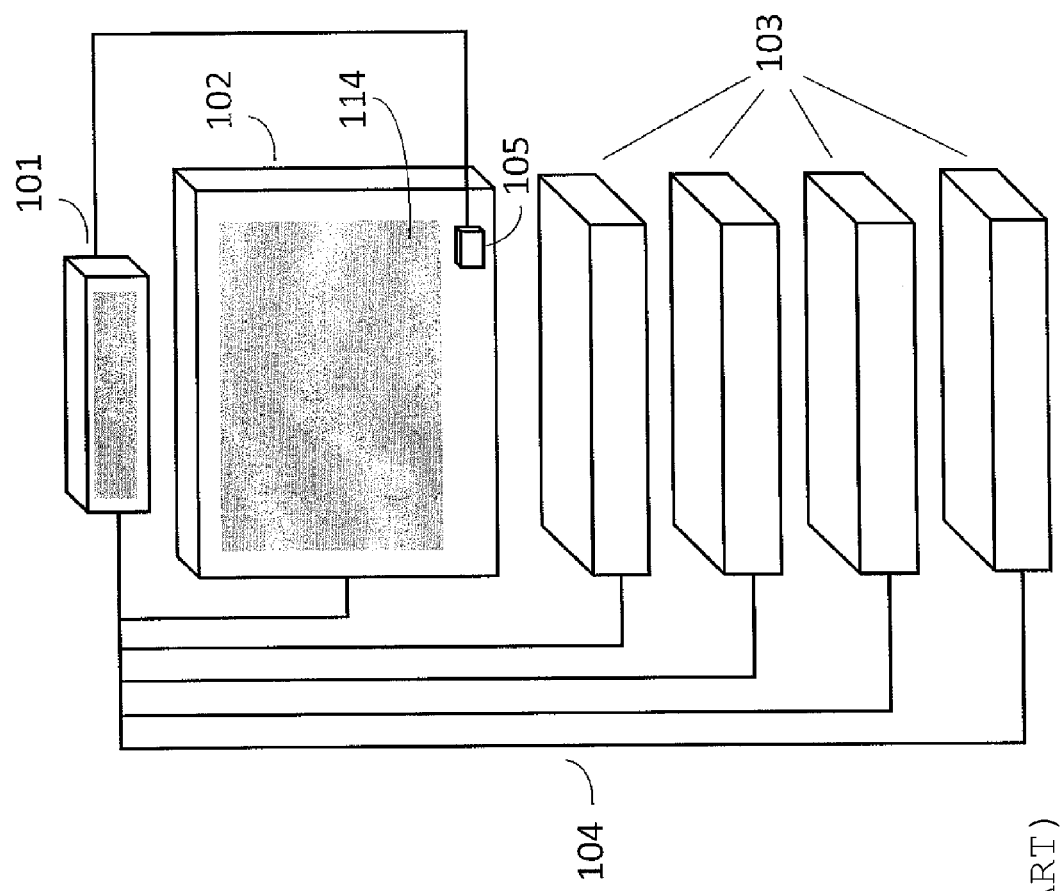
FIG. 1 shows a prior art arrangement with a TV and a peripheral device connected by wires to a set-top metering device.

Although prior wired metering systems as the ones described above tend to provide acceptable accuracy, they can only do so at the expense of relatively high operating costs. This stems from the fact that each cable connected to a peripheral is a potential source of errors, malfunctions or failures, because: (1) wired installations require careful setup and relatively high training in order to ensure that the source detection systems operate correctly in all situations; (2) wired installations are prone to experience malfunctions due to unreliable connections or wearing out of electrical interfaces; (3) wired installations are prone to be disarrayed by panel member interference, such as when panel members change their setups or disconnect (advertently or inadvertently) some wires essential for the operation of the metering system, which tends to produce a relatively high rate of revisits from technicians in order to fix these irregularities; (4) wired installations provide a path for potential electrical discharges that may burn essential meter components; (5) any addition in terms of peripherals connected to the TV set usually requires a new cable and a new visit from a technician to re-arrange the whole setup to include the new possible source of content; (6) wired installations tend to increase fatigue in panel members who drop out from the panel, requiring in turn more recruiting efforts to compensate for the loss of members.

The above factors contribute to increasing the cost of operating a panel. The more wires that need to be connected, the higher the rates of failures. The more methods that a meter uses to cover signal identification requirements, the more complex and error prone the measuring setup becomes. There is, thus, a need for a better audience measurement metering technology that can provide substantial improvements regarding the problems described above.

Example methods disclosed herein detect both media content output by a media rendering device and a plurality of user commands, such that synchronous processing of two or more data streams can be achieved. These methods and corresponding systems use the natural timing relationships observed in most media sessions to provide straightforward yet accurate wireless determination of content source. Because source information is extracted from user commands as opposed to using expensive hardware wired to all peripherals used with a TV set, installation and maintenance of the metering devices that employ such example methods are dramatically simplified, correspondingly reducing associated operating costs and failures. Because the timing relationships between output media content and user commands issued in relation to a media rendering device are statistically stable and repeatable, example methods disclosed herein can produce a source data of similar quality compared to conventional systems in a more efficient and cost effective manner.

Overview

In overview, the television audience metering system described herein combines content logs generated by a universal content identification system with other parallel information streams in order to assess source information for the content output by a TV or other media rendering device. The system and associated method leverages the synergies of two or more types of information streams to provide audience measurement data in an efficient and accurate manner, and in a way that can be universally applied to a range of media devices, sources and presentation types.

The audience measurement system and method can make use of any content identification mechanism capable of identifying content being rendered, such as being output on a monitored media terminal independently from the distribution platform used or the consumption mode chosen. For example, any suitable audio recognition mechanism can be applied. Given a monitored TV set or other device, the content identification mechanism should be operated in a substantially continuous (e.g., repeated) manner and independently of the associated devices/platforms in order to generate an uninterrupted content information stream describing the identity and timing of content items rendered on the monitored device or the absence thereof, for the duration of each monitored session. The content information stream generated for each session is then synchronously analyzed in conjunction with one or more parallel information streams generated by parallel detection mechanisms for assessing other related media variables, in particular for determining the source of the media rendered by the TV set. In a preferred example, the parallel detection mechanism includes a remote control detection system capable of reporting commands issued by one or more users of a TV set.

In contrast to conventional techniques of determining the source of the media and then switching to alternative methods for content identification dependent on the identified source, the system described herein determines the content stream initially, and the source of media is subsequently determined analytically by synchronously processing the information contributed by parallel streams in conjunction with the content stream. Thus, the system determines media content information before any media source is identified and subsequently uses that media content information as a template for synchronously analyzing associated parallel streams to assess the media source and/or other media variables.

When used for measuring TV audiences, the present system eliminates the need to include source identification hardware in the metering device as well as the need to connect any cables to the monitored TV or peripheral devices. The metering hardware that is used as a result is smaller and lighter than existing technologies, thus significantly reducing capital requirements and providing a more compact and user-friendly device. The fact that no electrical connections are required between the metering unit and monitored peripherals significantly reduces the probability of installation errors or malfunctions and of hardware failures, enabling a significant cost reduction in panel maintenance and enhanced reliability of the resulting information obtained. Furthermore, the system operates a computationally efficient and accurate method for combining the content and parallel information streams.

Examples described herein have other applications beyond the measurement of conventional television devices, as will be understood from the detailed description below.

Detailed Description

Figure 2:
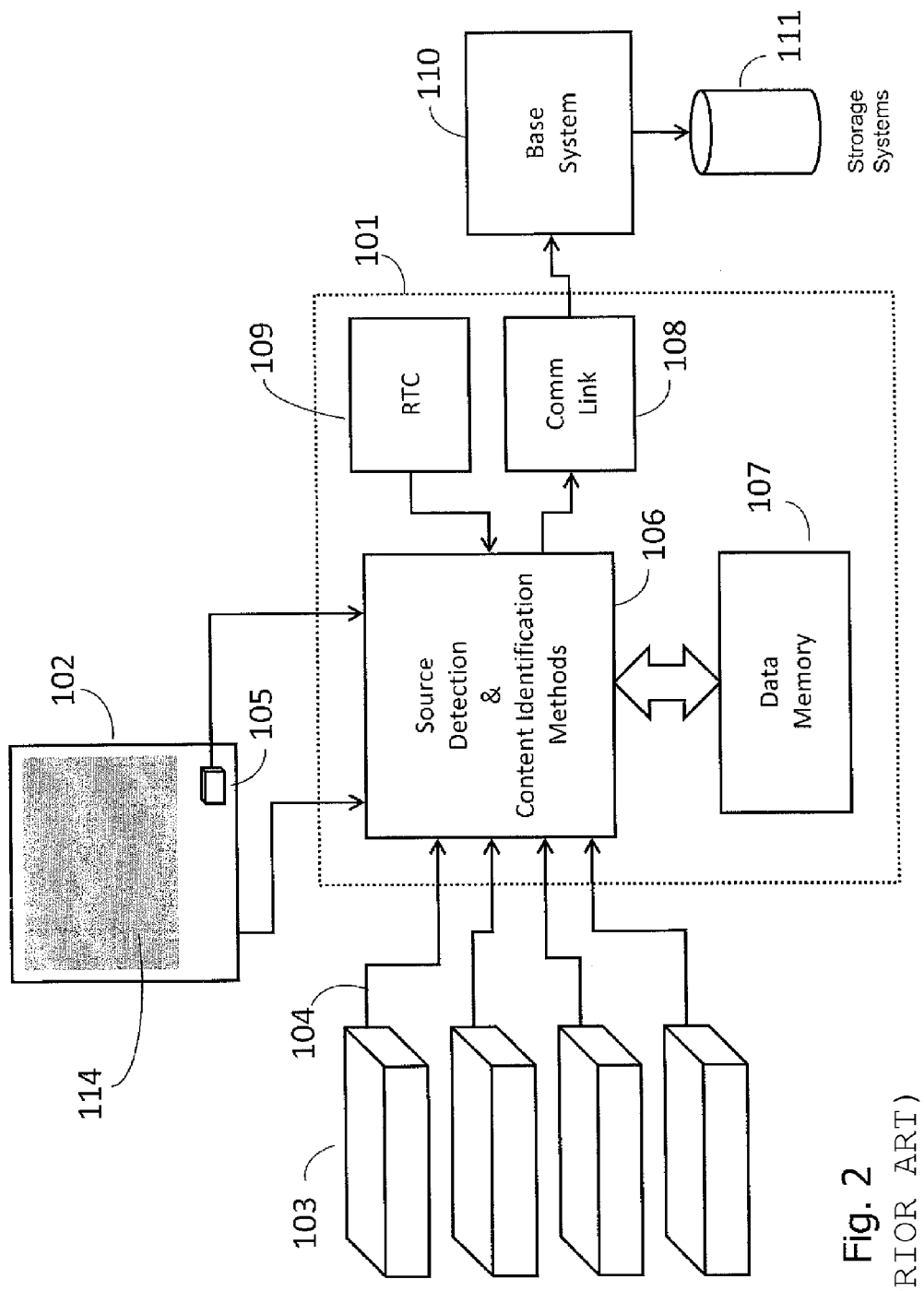
FIG. 2 shows a prior art arrangement including peripheral devices and a media rendering device in wired connection with a metering device.

FIG. 2 depicts a block diagram of a conventional metering system, showing a monitored TV set 102 including screen 114 and peripherals 103 connected to the metering device through cables 104. Conventional meter device 101 includes a block 106 that represents electronic hardware and software related to the detection of the source (the active peripheral) and the implementation of related content detection methods. For example, block 106 may include apparatus for detecting the active peripheral based on video-sync comparison, audio matching, or correlation analysis of any detected variable, etc. Block 106 may also include content identification apparatus of several types supporting, for example, frequency measurement of analog tuners, extraction of audio or video codes from received signals, matching of audio or video portions of the received signals, etc., etc.

Conventional meter 101 also includes memory block 107 representing memory resources available in meter 101 for storing data related to the monitored devices. Examples of memory block 107 may be a bank of flash memory, a hard disk or array thereof, etc. etc.

Meter 101 also includes a real time clock (RTC) 109 that provides a time reference for all measurement activities performed by meter 101. Examples of the clock 109 may be a simple counter within a microprocessor or a specific component to provide a time reference.

Meter 101 also includes communication block 108 which represents telecommunication apparatus included in meter 101 for transferring the data collected by the metering device to a base system 110. Communication block 108 may include modems of different technologies, network apparatus, radio links, etc. etc.

Base system 110 includes electronic apparatus capable of processing audience data generated by an electronic panel. Base system 110 may include a computer, or a plurality of them, a network, etc. Base system would usually include a storage system 111, which represents data storage mechanisms included in system 110 (e.g. an array of hard disks, etc.).

As discussed in the background section above, meter 101 may apply one or more methods for content identification. In general, several methods may be applied according to the characteristics of the platform in use (e.g. analog or digital, etc.). In conventional systems, the metering device attempts first to determine the active peripheral device (i.e. the peripheral generating the content rendered by the TV set) and then applies one or more methods according to the characteristics of the identified peripheral. For example, if block 106 of the metering device determines that the signal on the TV set is generated by an analog video-cassette recorder, it may switch to reading and storing the frequency measured in its internal TV tuner in order to identify the channel on screen. Instead, if a digital set-top box is identified as the source of the signal by block 106, then the metering device may switch to some other method, for example picture matching or banner identification, to determine the identity of the selected TV channel. Because the content identification method according to such conventional methods is dependent on the detected signal source, it can be used or taken into account only after the source has been identified.

The Metering Device

Figure 3:
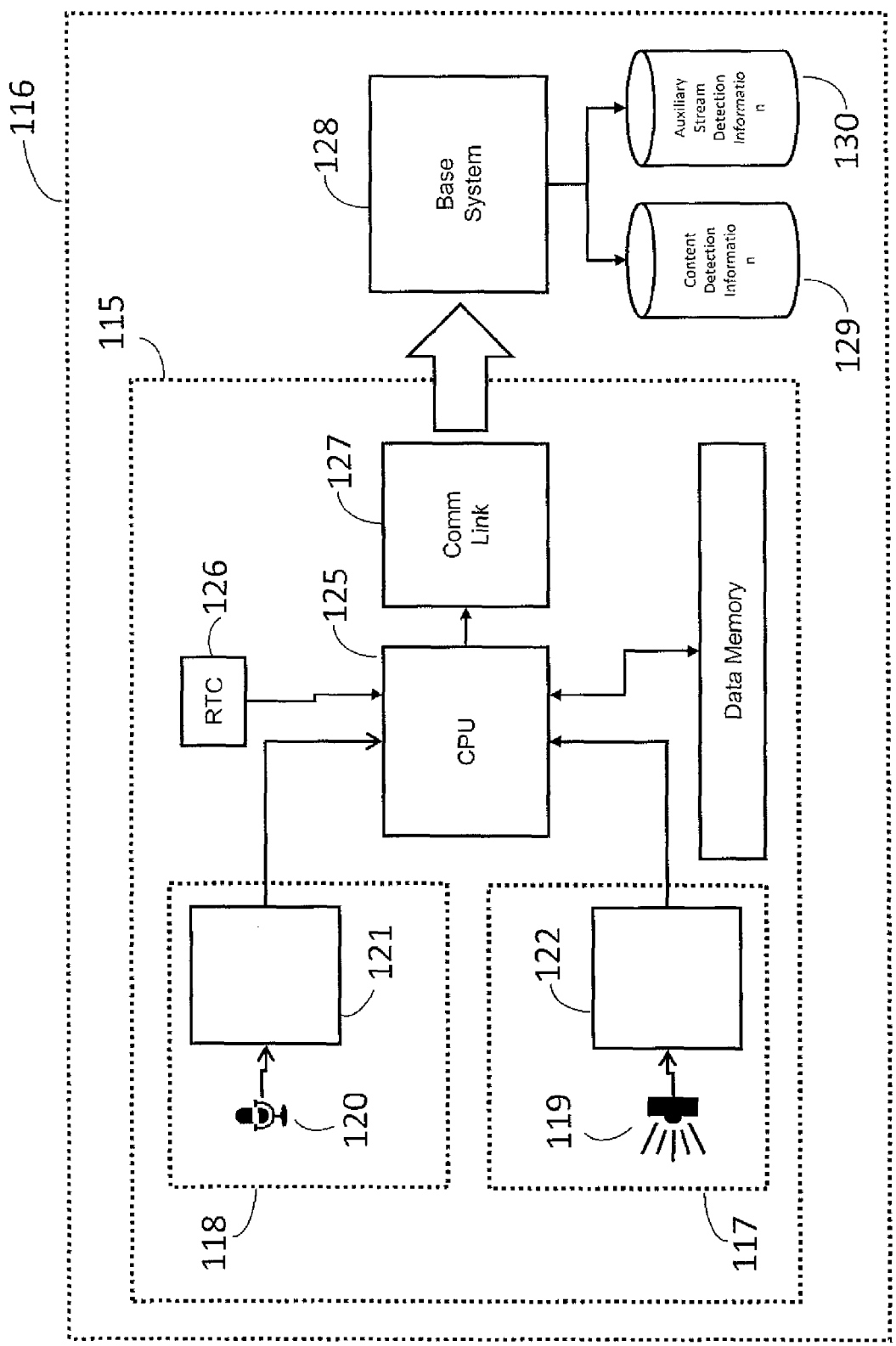
FIG. 3 shows a metering system according to the presently described examples.

FIG. 3 is a block diagram of an example system 116, including a metering device 115 according to a preferred example. Metering device 115 includes a content detection mechanism 118 including an audio sensor 120 which captures a copy of the audio signal being rendered by the TV set (or other media rendering device). As explained above, a universal content identification system is required to implement the system, so that content information can be generated regardless of the platform in use.

The audio sensor 120 may be attached to the case of the TV set in the vicinity of one of its speakers to optimize detection, or it may be simply placed nearby, preferably aiming at the speaker.

The audio sensor 120 may operate according to any appropriate audio identification technique, such as audio matching or audio content watermarking. Content matching based on audio will be known to the skilled person from prior art systems such as the TARIS 5000 meter and the Telecontrol UMX metering device (http://www.telecontrol.ch/typo3/uploads/media/Product_Brochure_UMS.pdf).

A benefit of audio matching is that it can be applied to many kinds of media usage, irrespective of the platform or media source used. Furthermore, there is no coding or other technology required for implementation at the broadcasting source such as the TV or radio station. The process is thus totally independent of the broadcasting stations.

The audio sensor 120 may additionally or alternatively operate using audio watermarking technology, such as the one developed by Arbitron (see e.g., www.arbitron.com). Audio watermarking technology will be well known to the skilled person, for example from prior art metering devices used by TNS (see e.g., www.tns.com) or those used by Nielsen Media Research in the US (see e.g., www.nielsen.com).

Audio sensor 120 may make use of any suitable audio identification technology, as long as it is capable of producing accurate enough timing about content chosen by users on a dynamic basis.

As shown in FIG. 3, audio sensor 120 is coupled to metering device 115 through an appropriate link, such as a wire connecting audio sensor 120 to an appropriate audio input module 121 of metering device 115. In the example shown in FIG. 3, audio input module 121 includes an analog amplifying/conditioning stage followed by an appropriate analog/digital converter in order to provide a digital audio stream as an input to CPU 125 of metering device 115. Audio input module 121 may include a processor for generating signatures or extracting codes from the detected signal (or both), which can be transferred to the CPU 125 in a compact format. CPU 125 includes any suitable processing hardware, for example one or more microprocessors and related hardware and software, which uses RTC 126 as a real time reference. Metering device 115 as shown in FIG. 3 also includes communication link 127 which includes communication hardware and software suitable to transfer data collected by metering device 115 to a central processing base 128, usually located in a remote site relative to the monitored TV set 102.

Metering device 115 also comprises a parallel detection mechanism 117, which in a preferred example comprises infrared sensor 119 capable of detecting bursts of infrared beam transitions produced by remote controls. The parallel detection mechanism 117 may also include an infrared input processor 122 which processes the signal generated by infrared sensor 119 and transfers derived information to the CPU 125 for further identification of associated user commands. Parallel detection mechanism 117 may include as well other types of receptors, for example radio frequency, ultrasonic, etc., according to the type of remote controls available in the monitored TV setup.

As is known to the skilled reader, the vast majority of TV sets and peripherals available today use infrared beams for their respective remote controls, although some devices exist that use other methods, such as ultrasonic beams or electromagnetic links (e.g. according to the Bluetooth or ZigBee standards). Generally, user commands are represented by short bursts of serial digital information that convey respective command identification codes. The parallel detection mechanism 117 according to the present examples is capable of detecting one or more such types of command codes in order to identify commands issued by users.

As mentioned above, each metering device 115 in an audience measurement panel is in communication with a central processing base 128. The central processing base 128 includes any suitable arrangement of computers, data networks, storage and communication facilities required to collect and process the audience data generated by the metering device(s) 115. In particular, processing base 128 includes storage facilities 129 and 130 for storing respectively the information collected by content detection mechanism 118 and the parallel detection mechanism 117.

Content Detection

Figure 4:
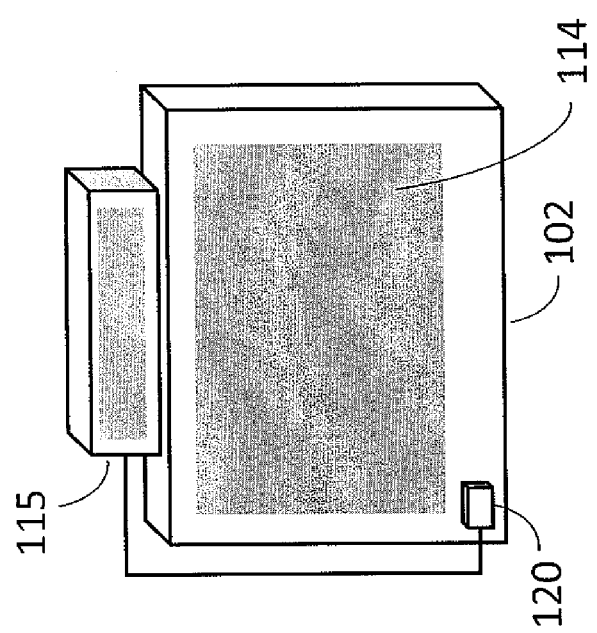
FIG. 4 shows a metering device as depicted in FIG. 3, using an audio sensor for content detection.

It will be understood from the description above that a metering device used with the present system is capable of reporting the content output by the TV set in a substantially continuous way and independently of the distribution platform or device providing the content. For this reason, the metering device relies on a detection mechanism that assures the availability of content information regardless of the platform in use. FIG. 4 depicts a TV set 102 monitored in this case by metering device 115 according to a preferred example of the system, where an audio sensor 120 is deployed as part of content detection mechanism 118.

Content detection mechanism 115 shown in FIG. 4 comprises audio sensor 120 capable of generating a copy of the content signal rendered by TV set 102 on display 114. Audio sensor 120 may include a microphone attached or placed close to one speaker of TV set 102. In other cases it may be an external speaker linked to the TV set in some suitable manner (e.g. a wire, an RF link, etc.), or may be as well a cable connected to a monitor output connector of TV set 102. Alternatively or additionally, a magnetic sensor capable of detecting the audio signals rendered by TV set 102 can be used as a content sensor device.

Figure 5:
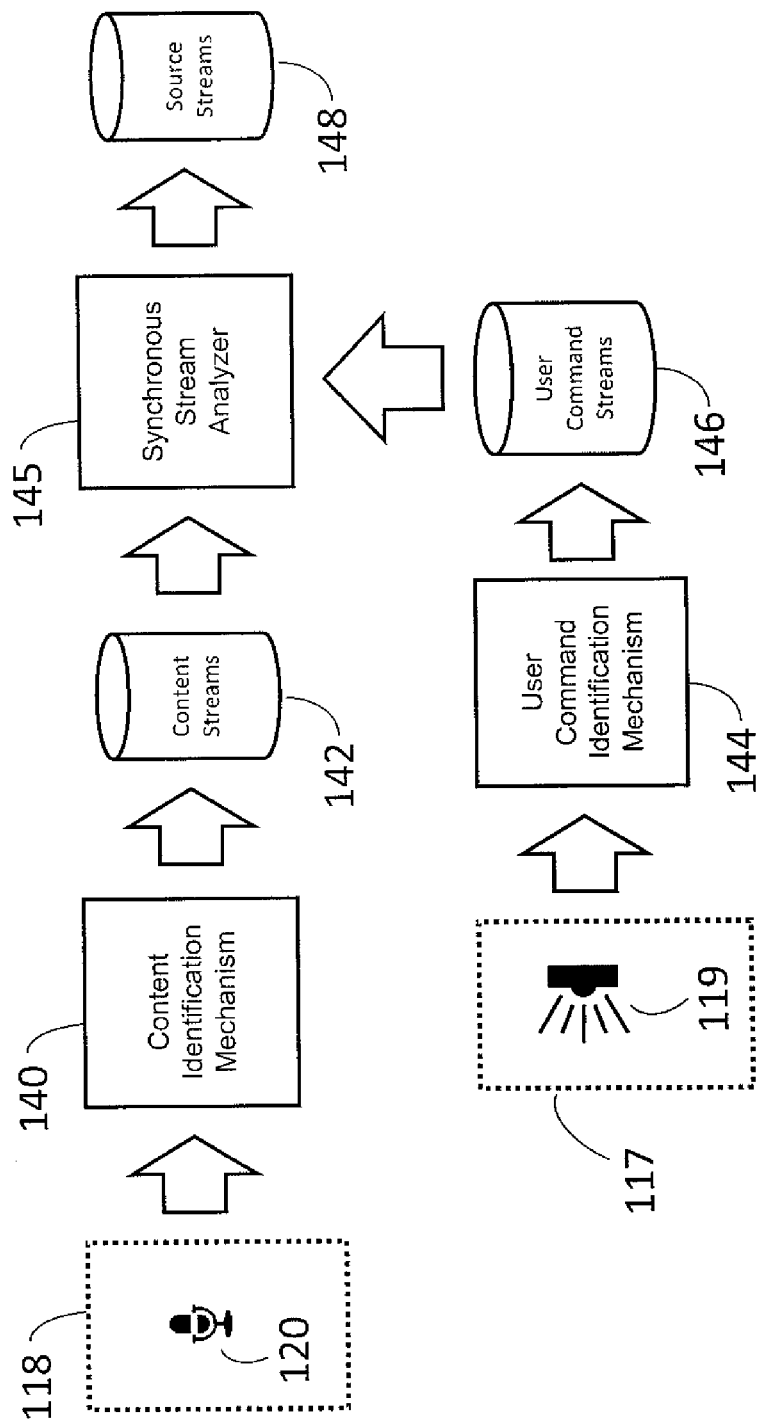
FIG. 5 shows an example flow diagram of content and user command information processing.

FIG. 5 shows an example data flow diagram of the processing that takes place in system 116 according to FIG. 3.

As depicted in FIG. 5, content detection mechanism 118 produces the initial information required to identify content. In a preferred example, the content detection mechanism 118 includes audio sensor 120. The information produced by content detection mechanism 118 is then processed by content identification mechanism 140 (also referred to as a content identifier 140) which may rely on audio matching and/or audio coding techniques. By way of example, content identification mechanism 140 may include a processor to extract identification codes embedded in the audio signal, or alternatively it may implement matching algorithms capable of recognizing a broadcast signal by signature correlation analysis, or a combination of both techniques.

The output of content identification mechanism 140 is processed to compile a content information stream reporting signals identified in the TV set under measurement. In the illustrated example of FIG. 5, the content information stream is stored in a storage 142. Such a stream includes information about the identity and timing of exposure segments, which for example correspond to periods of time during which the identified content has been substantially unchanged. Exposure segments are used to describe the media content items rendered by the TV set under measurement, preferably including start time, end time and identity of the content with a specified accuracy.

Parallel Detection

On a parallel branch of the data flow, the information produced by parallel detection mechanism 117 is processed by user command identification mechanism 144 (also referred to as a user command identifier 144) which includes a processor capable of identifying user commands issued by users of the TV set or other device under measurement. Several known techniques may be used for identifying the user commands, such as the example described in U.S. Pat. No. 5,228,077, or the example described in U.S. Pat. No. 4,623,887. The output of the user command identification mechanism 144, symbolized in FIG. 5 is stored in a storage 146, and includes a parallel information stream composed of a list of command codes, including a time stamp and an additional code identifying the remote control used for issuing each recognized command.

Although infrared processing is preferred because of its ubiquity, system 116 may use other information produced by a peripheral or TV set as a proxy of user commands. For example, some satellite decoder devices produce digital codes on a specific hardware port every time a user makes a content choice specifying the content shown on screen, together with time shift, etc. Such functionality is usually known as service information (SI) and the information conveyed by such code is usually made available for metering purposes. In some cases, the SI code may be used as a proxy of user commands, since they are causally connected thereto. In other words, the fact that SI codes are received, or have changed value since the last time it was specified may be used as an indication that such device is being operated by a user; therefore indicating the source of the content being output by an associated media rendering device.

Once the two respective streams are available in the storages 142 and 146, a synchronous stream analyzer 145 processes both streams in conjunction to produce a source information stream, which is stored in a storage 148, describing source segments identified by the system. This process will be understood further from the description below.

Determining Source Information

FIG. 6 shows an example of a list describing user commands 150 as reported by user command identification mechanism 144. Each user command is represented by a record containing a corresponding timestamp, a command identification (usually associated to a specific key of a user keyboard or a remote control) and an indication about the device associated to each command.

Figure 7:
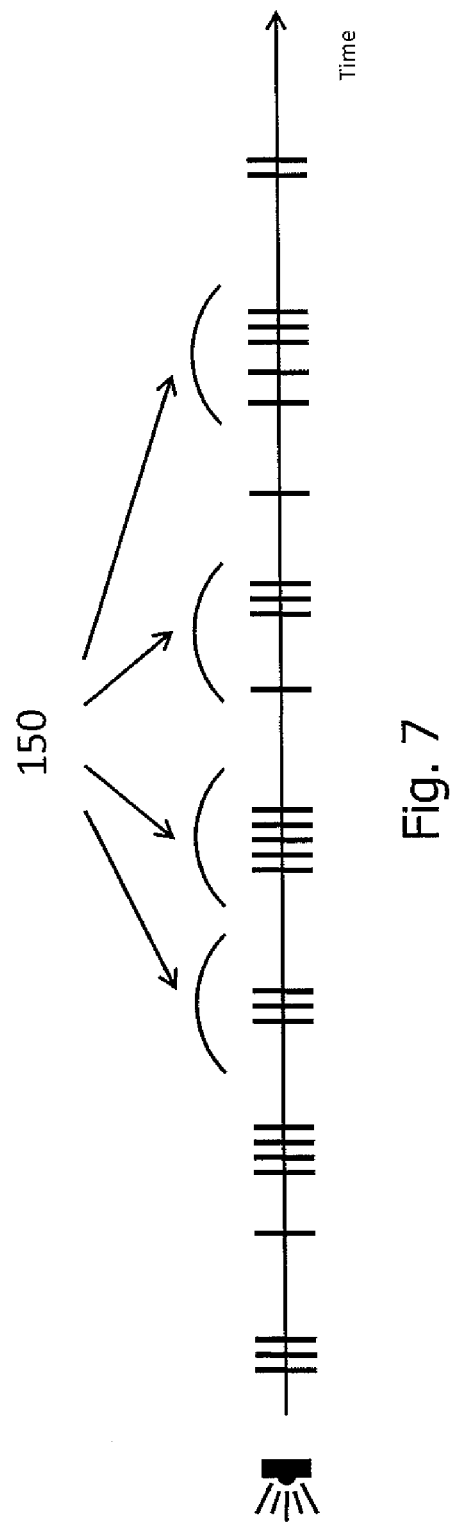
FIG. 7 shows a graphical representation of a series of user commands over time.

FIG. 7 shows a graphical representation of user commands 150 as reported by user command identification mechanism 144 against a timeline in a suitable timescale. Each vertical line represents a user command detected by the system, and the position of each line corresponds to the respective associated timestamp. FIG. 7 depicts a typical pattern observed in any audio-visual media consumption session, as would be recognized by the skilled reader A possible approach to extracting source information from the command information might be to interpret the stream of commands in order to assess the time points at which a source change occurs. For example, an intelligent software routine may analyze the sequence of commands in order to determine that a user has chosen to change the active device, for example to go from his or her DVD player to watching digital TV. In principle, such an approach could provide some useful information but it is extremely demanding in terms of development efforts and processing power given the myriad combinations that must be analyzed, and it tends to be unstable given that it is dependent on the particular configuration, software version, etc., of devices connected to the measured TV set.

Moreover, in many cases, the commands issued by a user are not related to what is being rendered on screen but to other operations related to those devices. For example, a user may be watching a TV broadcast on screen while programming a video recorder to record some upcoming program, or rewinding a cassette that has been already watched, or watching digital or cable TV that enables viewing of a program and of a user guide or menu concurrently.

All the above problems are further compounded by the fact that there is a possibility that the command stream reported may not be complete. For example, some commands may have been missed by the command detection mechanism used. Thus it will be appreciated that the possible approach outlined above is, in practice, not feasible because even using a highly stable command detection mechanism, it becomes difficult, if not impossible, to extract source information from the command stream given the complexity of command streams that can be produced when using a media rendering device. Such a technique furthermore would only become more difficult over time as more devices are connected for use in conjunction with the media rendering device.

In contrast to the possible approach outlined above, the present method and system recognizes and takes advantage of synergies produced by processing a parallel information stream describing user actions in combination with the content information stream describing the media consumed by the user(s) as a consequence of such actions. It thus can derive source information in a more straightforward, computationally less intensive, and yet still highly accurate manner.

The process is realized by a synchronous stream analyzer 145 as shown in FIG. 5, which is a general purpose logic processing unit including hardware and software sufficient to realize the methods described herein. The logic realized by the synchronous stream analyzer 145 is based on two natural timing characteristics that can be observed in typical media consumption sessions: (a) the tendency of media consumers to consume audio visual media in the form of relatively short segments; and (b) the typical values observed in the latency of any device's user interface.

Users consume audio-visual media in the form of exposure segments. As will be understood from the preceding descriptions, an exposure segment is defined herein as a period of time during which a user is exposed to an uninterrupted content stream, typically lasting a few minutes. The observed average segment length is in the range of 7 minutes in most panels, based on known media statistics.

Exposure Segments

A viewing session can be described as a succession of exposure segments of variable length, in which each segment is defined by a plurality of media variables that each stay fixed at given values during the duration of the segment. In general, the information characterizing an exposure segment may be summarized by the media variables describing each exposure segment. For example, a given exposure segment may be characterized by a channel number, it may include also a time-shift indication, and it may convey as well an indication about the distribution platform or active device that is rendering the content consumed, hereinafter the source of the content. By definition, the values taken by the media variables of an exposure segment are assumed to be invariant for the segment. This characteristic of exposure segments will be referred to hereinafter as the Rule of Segment Invariance.

Figure 8:
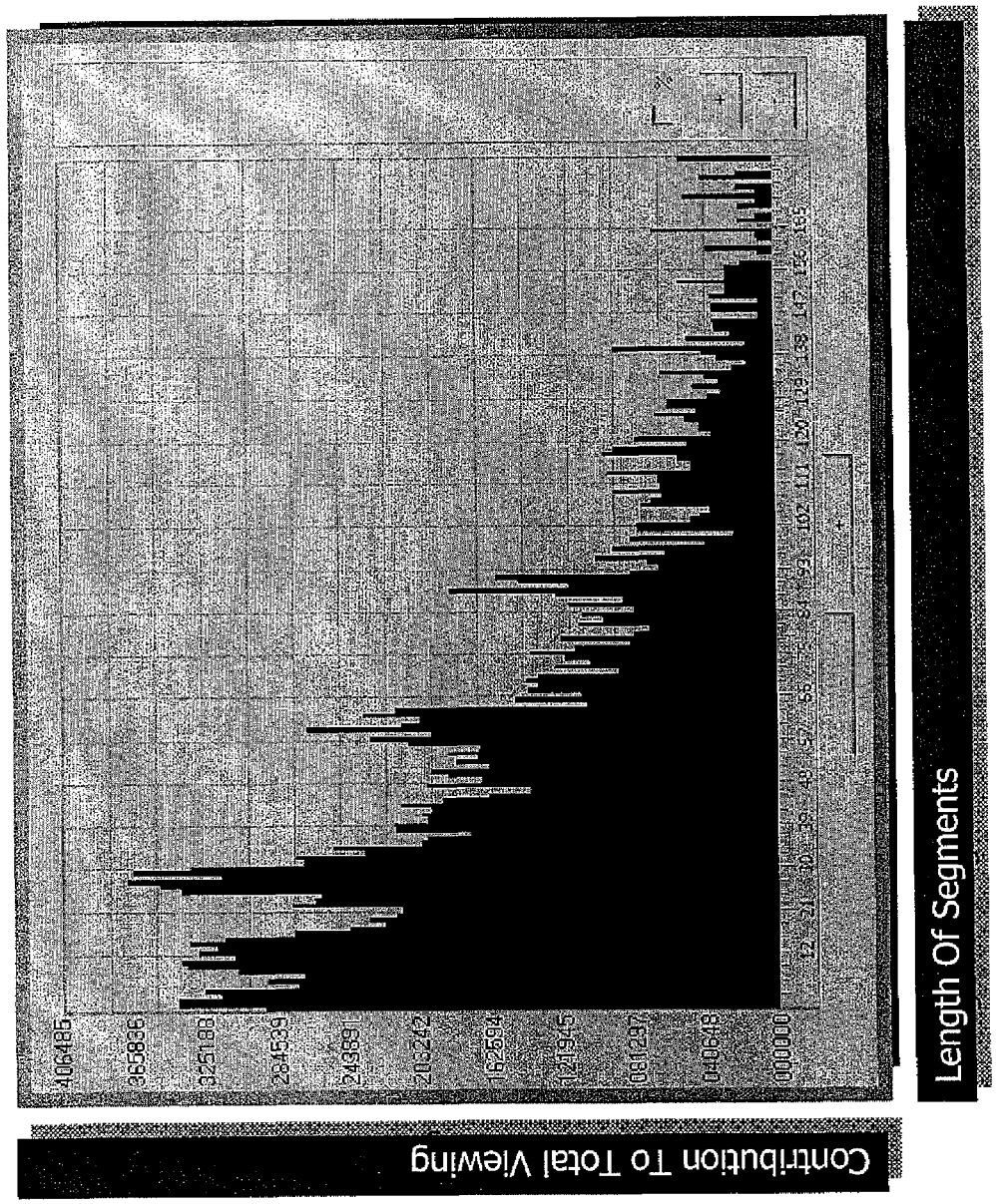
FIG. 8 shows an example distribution of exposure segments for user media consumption.

FIG. 8 shows a chart describing the distribution of segment lengths, as observed in a typical television audience measurement (TAM) panel. It can be seen in the chart of FIG. 8 that there are very visible peaks at the time lengths corresponding to 15, 30, 60 and 90 minutes, as can be expected given that these are common lengths of TV programs, and viewers tend to stick to a program that they like, only searching for alternative content streams after the program has ended.

Figure 9:
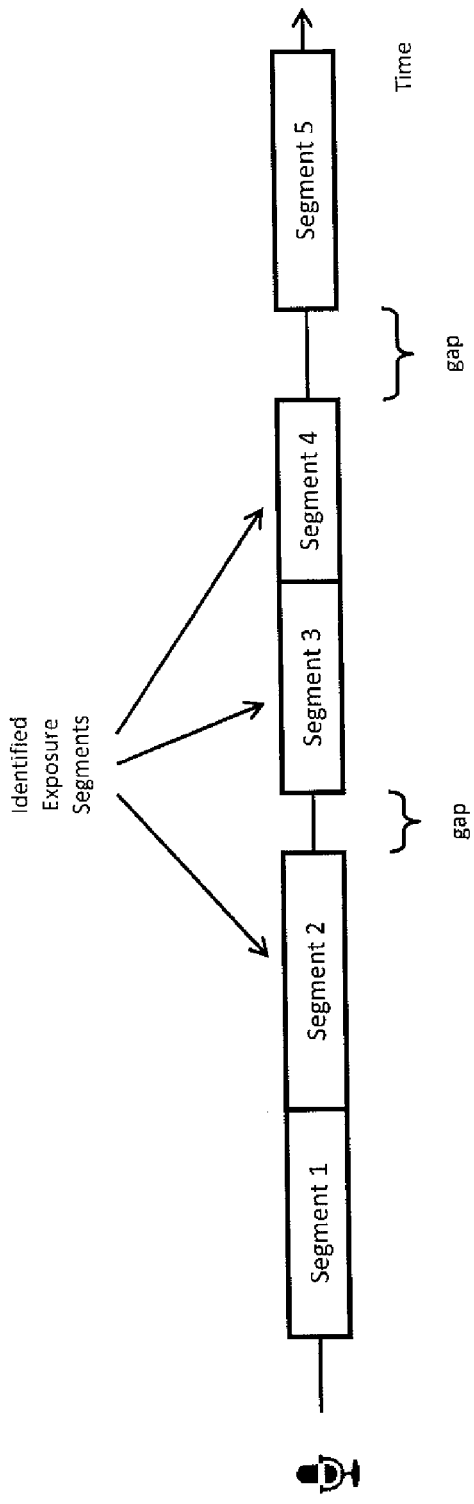
FIG. 9 shows a series of exposure segments defining consistent periods of user media consumption and gaps therebetween.

FIG. 9 depicts a sequence of exposure segments such as the ones reported by content identification mechanism 140, which are represented by rectangles positioned over a timeline according to a suitable timescale. Most existing technologies for content recognition specify a minimum exposure time below which no recognition is possible or reported. Such minimum time is usually referred to as a persistence threshold. By definition, no reported segment may be shorter than one persistence threshold. The spaces left between identified segments will be referred to herein as gaps. Gaps are usually due to short exposure periods, shorter than the persistence threshold.

Most electronic devices have a natural delay between the time at which any command is issued by a user and the time at which a corresponding action is performed or completed by the corresponding device. This delay will be referred to hereinafter as the user interface (UI) latency.

Most media terminals and peripherals are designed to react to user commands within a few seconds to avoid annoying delays in the operation of such devices. For example, the observed typical UI latency may need to be lower than 10 seconds (or some other duration) for the device to survive in today's competitive consumer electronics market. A similar statement may be made about hardware and software for personal computers, where users are usually ready to pay a premium for performance.

The two factors described above, namely, the tendency for users to consume audio-visual media in the form of relatively short segments and the relatively short UI latency associated to most contemporary media devices, are used in combination by synchronous stream analyzer 145 to generate additional media variables from the detected streams. By processing time relationships between reported events of the content stream and the command stream (generated by content identification mechanism 140 and user command identification mechanism 144, respectively), synchronous stream analyzer 145 is able to determine the source of any content segment, replacing the costly hardware that is required to obtain a similar result in conventional systems.

As explained above, the values taken by the media variables of any exposure segment are assumed to be invariant for the whole segment. It is the responsibility of the content identification mechanism 140 to ensure its output is consistent with that rule. In other words, content identification mechanism 140 must ensure that any reported segment is interrupted and eventually followed by a new segment whenever any relevant media variable has changed with respect to the values reported at the beginning of each segment. Not every content identification technology is equally capable of realizing such a feature. Therefore, care should be taken in choosing a compatible technology for content identification, as the logic realized by synchronous stream analyzer 145 relies on the level of accuracy with which exposure segment limits are defined by content identification mechanism 140.

A characteristic of the chosen content recognition mechanism is that it provide a guaranteed accuracy in the resolution of segment borders that is significantly lower than the specified persistence threshold. This is required to ensure the relevant commands carrying the source information are consistently identified for most reported segments, as it will become clearer further below. In practice, using a persistence specification of 15 seconds, a ±3 seconds typical accuracy specification is enough to realize satisfactory results. A content matching mechanism such as the one used by UNITAM is capable of realizing the required accuracy. Other systems based on watermarking may also be able to realize the required accuracy. If needed, the persistence specification can be increased to satisfy the accuracy requirement. In other words, the method and system described herein are realizable in principle using any content recognition mechanism that guarantees a specific accuracy in terms of border resolution, albeit in some cases a larger persistence specification may be required to ensure its effectiveness.

User Command Filtering

Considering now the user command identification stream, user commands, as reported by user command identification mechanism 144, may be classified in two distinct classes: (1) commands that are not expected to produce any content change (e.g. volume up, volume down); and (2) commands that are expected to produce change of content (e.g. channel up, channel down, number keys, etc.).

The second class of commands will be referred to herein as critical commands.

Because of the Rule of Segment Invariance and the UI latency, a critical command that effectively produces a reported content change may be detected only within a UI latency period in advance of a subsequent exposure segment. This means that such a command may be found only either close to the end of a preceding segment or in a gap. In other words, because critical commands are expected to change some media variable, and because this is assumed to be detected by content identification mechanism 140 and reported as a new segment, no such commands may be found in the middle of segments.

The recognition of the position of critical user commands as set out above means that a user command reported within any segment can be assumed to be innocuous (i.e. not capable of changing any media variable). Naturally, this does not apply to a command that may have been missed or unidentified by user command identification mechanism 144, or ignored by the intended receiving device by mistake. Such cases are deemed unlikely and therefore not considered as part of the main processing realized by synchronous stream analyzer 145. Apparatus for dealing with the effects of missed commands are described below in relation to FIG. 15. Parallel detection mechanism 117 ensures that eventual missed commands do not configure any significant portion of all commands issued by users in any given session. In other words, parallel detection mechanism 117 is capable of reducing or minimizing omissions to an acceptable level, consistent with the required accuracy of the output data generated by system 116 as a whole.

Some IR commands are issued pointing the corresponding remote control in an inappropriate direction inadvertently. Using more than one IR detector can significantly reduce the probability of missing a command for that reason. For example, placing three detectors aiming at different directions separated 45% from each other and choosing the best result (e.g. a result confirmed by at least two of the three detectors) can be an effective way of reducing or minimizing errors.

The Rule of Segment Invariance ensures as well that a user command producing a source change (e.g. switching viewing from a set-top box decoder to a DVD player in a TV setup) may be found only outside of any exposure segment, since a change of the active device is expected to produce an interruption of the streaming content.

Figure 10:
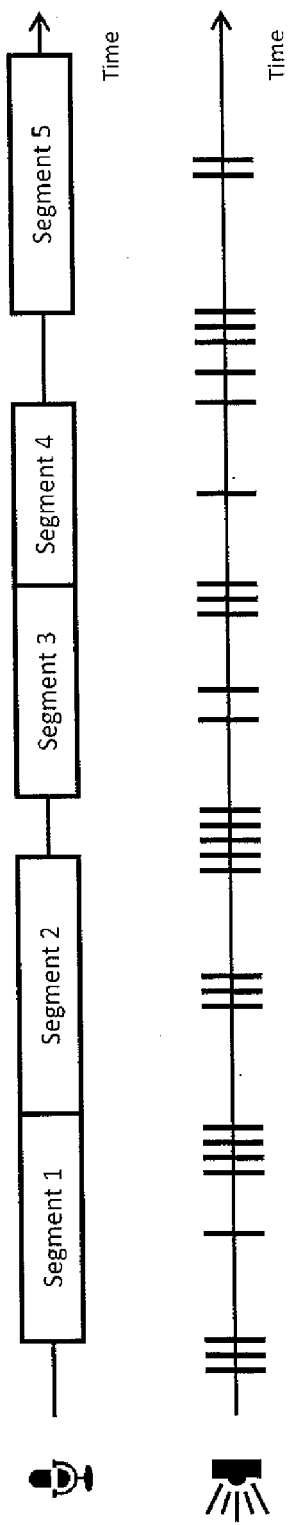
FIG. 10 shows the relationship between a series of user commands and a series of exposure segments for a media rendering device.
Figure 11:
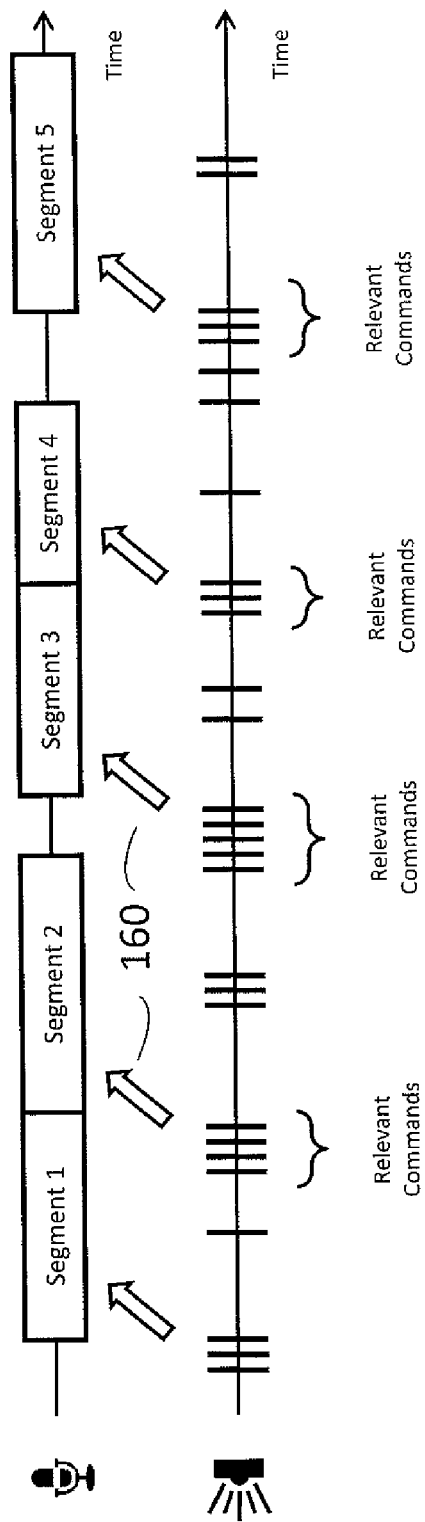
FIG. 11 shows in more detail the relevance of the user commands as shown in FIG. 10 to the exposure segment shown in FIG. 10.

The rationale described above is used by synchronous stream analyzer 145 to process both streams synchronously in order to identify respective sets of relevant commands for each segment reported by content identification mechanism 140. FIG. 10 depicts a graphical representation of both streams in synchronous timelines. The software routines run by synchronous stream analyzer 145 take into account that relevant commands can be found only outside the associated segment, and given the relatively short UI latency offered by contemporary devices, those commands can be found only within a few seconds before the beginning of each respective segment. This basic relationship between both streams is depicted in FIG. 11, where the sloped arrows 160 show the association between segments and their respective relevant commands.

Figure 12:
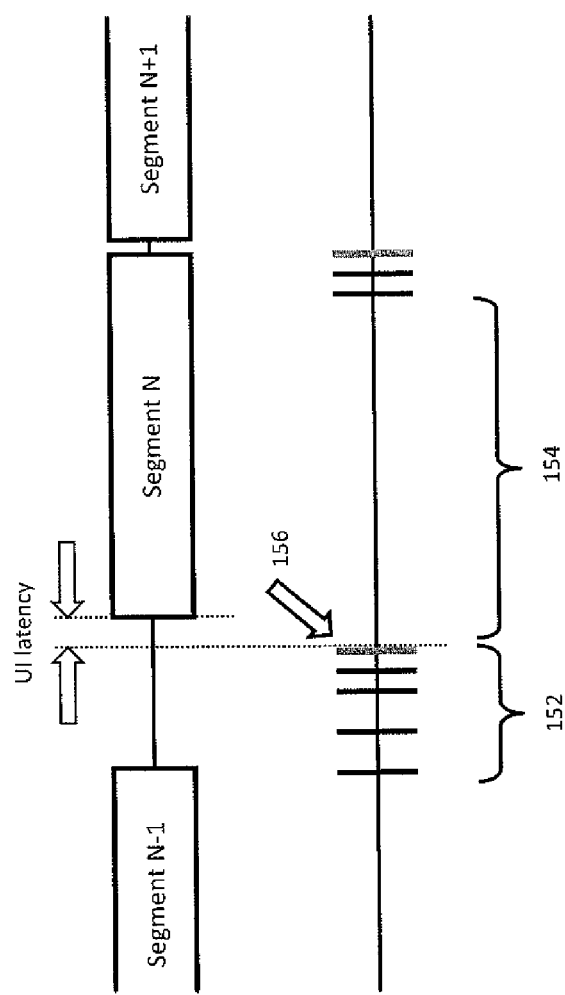
FIG. 12 shows the latency between a critical command as shown in FIG. 11 and the corresponding next exposure segment.

FIG. 12 shows in more detail the basic timing relationships used by synchronous stream analyzer 145, using three generic exposure segments: N, N−1 and N+1. As shown in FIG. 12, each exposure segment is usually preceded by a set of relevant commands (which may include only one in many cases). This set of commands is depicted in FIG. 12 as leading burst 152. A command that has produced the content change leading to segment N is to be found among leading burst 152, assuming it has been correctly identified by user command identification mechanism 144.

Taking into account the Rule of Segment Invariance, the persistence specification and the UI latency, it can be seen that leading burst 152 is immediately followed by an empty space 154 where no critical commands are found (for the reasons explained above). Such a pattern, which is observable in most exposure segments, is created by the natural timing relationships described above.

The existence of empty space 154 is guaranteed by the Rule of Segment Invariance and the persistence specification and plays an important role in allowing the synchronous stream analyzer 145 to easily locate leading burst 152 by analyzing the timestamps reported for each segment reported by content identification mechanism 140 and for each command reported by user command identification mechanism 144.

Once synchronous stream analyzer 145 has identified leading burst 152, it identifies last leading critical command 156 by identifying the last critical command that happens right before empty space 154, usually occurring just a few seconds before the start of the corresponding segment (due to the UI latency).

Last leading critical command 156 holds most of the information regarding the source of the corresponding segment, since most command sequences leading to an exposure segment end with a last command defining the user's choice and, therefore, can be causally associated to the exposure segment. The device associated with the last critical command (and therefore the one executing it) can therefore be safely assumed to be the active device rendering the content during the subsequent segment. By using the time relationships explained herein, synchronous stream analyzer 145 identifies last leading critical command 156 from the rest of commands in the command stream and assigns source information to the corresponding segment accordingly.

For example, a user watching a TV channel may decide to switch to another channel, for which he/she may use the TV set's remote control commands Program Up and Program Down repeatedly, quickly browsing the content available in each successive channel until something interesting is found. In such cases, the last command of the burst registered by user command identification mechanism 144 will be either Program Up or Program Down, each of which would indicate that the TV set is the active device. If, instead, the user is watching television through a set-top box decoder, the remote control used for the selection is the one associated with the decoder, which indicates use of that device. The user may even have switched between TV set and decoder back and forth during leading burst 152, but the last command is still the one that holds the information about the active device associated with the subsequent segment, regardless of the various possible combinations of commands leading to that choice.

The use of only one command is enabled by the continuous availability of content information and the timing relationships described herein, which significantly simplifies the task of finding source information within the command stream. The causal association between last leading critical command 156 and its corresponding segment is valid in the vast majority of cases, with an example exception being when a user happens to find a desired content by chance immediately after changing source. As explained herebelow in relation to FIGS. 14 and 15, those rare cases are resolved by iteratively importing source information among adjacent segments.

Figure 13:
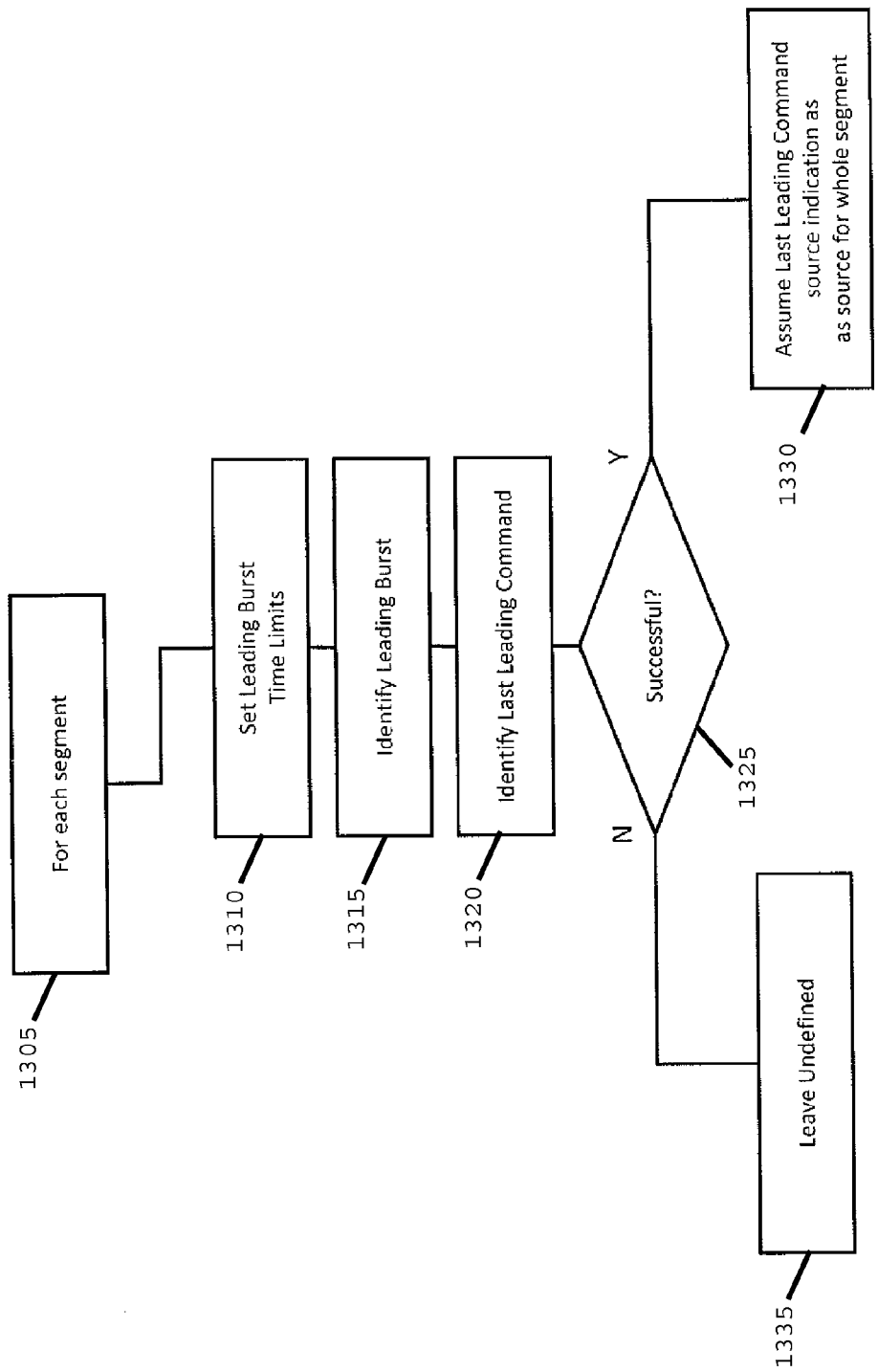
FIG. 13 shows an example flow diagram for correlating exposure segments and user command information to determine source information for a media rendering device.

FIG. 13 summarizes the methods realized by synchronous stream analyzer 145 in the form of a flow diagram. As shown therein, for each exposure segment (block 1305), as identified from the continuous stream of content identification information, the time limits for the corresponding leading burst of commands (which are assumed to be responsible for the change from the previous segment to the current segment) can be identified (block 1310). Within those time limits, the leading burst 152 itself can be identified (block 1315), which normally will include a number of different commands.

Within leading burst 152, the last leading critical command 156 is identified (block 1320). The device/source corresponding to the remote control that issued the last leading critical command 156 can thus be taken to be the source of the media content for the current exposure segment, which followed last leading critical command 156 (block 1330). Alternatively, in the event that last leading critical command 156 cannot be identified, the source remains undefined for the current exposure segment (block 1335), but may still be defined independently and accurately for the following exposure segments, using the disclosed method iteratively as shown in FIG. 13. Hence, any eventual lack of success of identifying the source for a first exposure segment has no knock-on effect for identifying the source for the upcoming exposure segment. Alternatively or additionally, information from the preceding or succeeding exposure segment may be used to infer source information for the current exposure segment for which a source has not been successfully defined using the method according to FIG. 13. This inference method can be understood further with respect to FIGS. 14 and 15 discussed below.

By using and manipulating content and command information in the manner as set out in FIG. 13, the synchronous stream analyzer 145 does not need to interpret complex and varied combinations of commands in order to deduce the possible source of a signal. Instead, the synchronous stream analyzer 145 can take advantage of natural timing patterns observed in the monitored sessions to locate one single relevant command that, in most cases, holds the information required to assess the source of the content on screen. Because users tend to consume content as a series of exposure segments, and because each segment implies a choice made by users, almost every exposure segment is preceded by a set of commands from which the Synchronous Stream Analyzer 145 can extract source information. The information provided by content identification mechanism 140, which is continuously (e.g., repeatedly) active, is used as a template for qualifying the information provided by command identification mechanism 144, enabling identification of relevant commands from which source information can be subsequently extracted, thus eliminating the need for expensive hardware and costly procedures conventionally required to produce an equivalent result.

Missed Commands

In some unlikely situations, the last leading critical command 156 may have been missed by user command identification mechanism 144, as explained above. However, in the vast majority of cases, leading burst 152 is composed of more than one command as explained above, which means that some other command would be taken as last leading critical command 156 mistakenly by synchronous stream analyzer 145. Even in such situations, it is likely that such preceding command still belongs to the same device (e.g. repeated keystrokes of the Program Up key while channel zapping or channel surfing), in which case the assessed source would still be correct, even though the command producing the content segment may have been misidentified.

Moreover, if command identification mechanism 144 misses the detection of the leading burst 152, as it may happen sometimes with infrared detection mechanisms, the uncertainty produced by this situation affects only one corresponding segment since it can be reliably assumed that a successive segment would be processed normally.

Furthermore, even in the event that last leading critical command 156 for each of two successive respective segments is missed, because users tend to make more than one tentative choice before settling on one definitive segment (sometimes called channel zapping or channel surfing), it is still very likely that another preceding command belonging to the corresponding leading burst 152 would still lead to a correct identification of source, if that other command was mistakenly assumed to be last leading critical command 156. In most cases that other command still belongs to the same device that generated the missed actual leading command, and therefore would still provide a correct source indication.

There may still be some situations in which no leading burst 152 is detected and therefore last leading critical command 156 is not identified either, or even if one command has been correctly identified it turns out not to be a critical one (i.e. the command is not directly associated to any choice of content). For example, a user may navigate some menu functions associated with a TV set to select a content item for consumption, using an unusual sequence of keystrokes that command identification mechanism 144 may not be able to identify correctly. In all such cases, no valid source information may be inferred from last leading critical command 156.

In such cases, synchronous stream analyzer 145 may seek more evidence in the adjacent segments. As explained above, the Rule of Segment Invariance realized by content identification mechanism 140 assures that, if any source change actually occurs associated to a choice of content item, the commands responsible for producing such source change are to be found in a preceding segment or gap. Therefore, if the source is known for either the preceding segment or the following one, the same source information can be safely assumed to be valid as well for the segment under analysis, as long as no evidence of a source change is found in the corresponding gaps, since it is only there that any evidence of a source change may be found.

Figure 14:
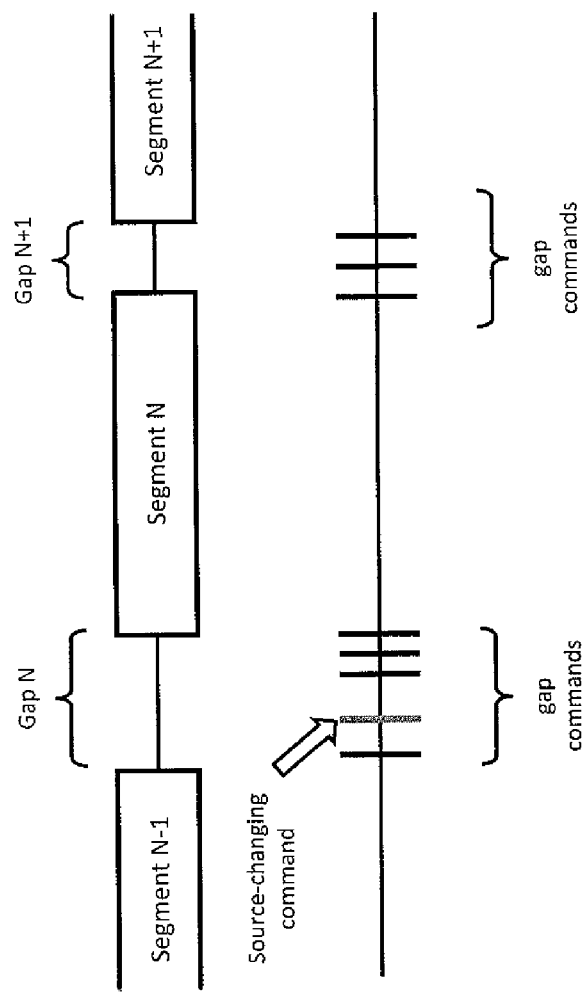
FIG. 14 shows the identification of a source changing command in a gap between two exposure segments.

FIG. 14 shows in more detail such situation. FIG. 14 shows 3 generic successive segments as reported by content identification mechanism 140 tagged as Segment N−1, Segment N, and Segment N+1, as well as corresponding gaps Gap N and Gap N+1, which are named according to the segment immediately following the gap. Segment N is assumed to be the one under analysis at any given point in time. The logic applied to such a situation is set out in FIG. 15.

Figure 15:
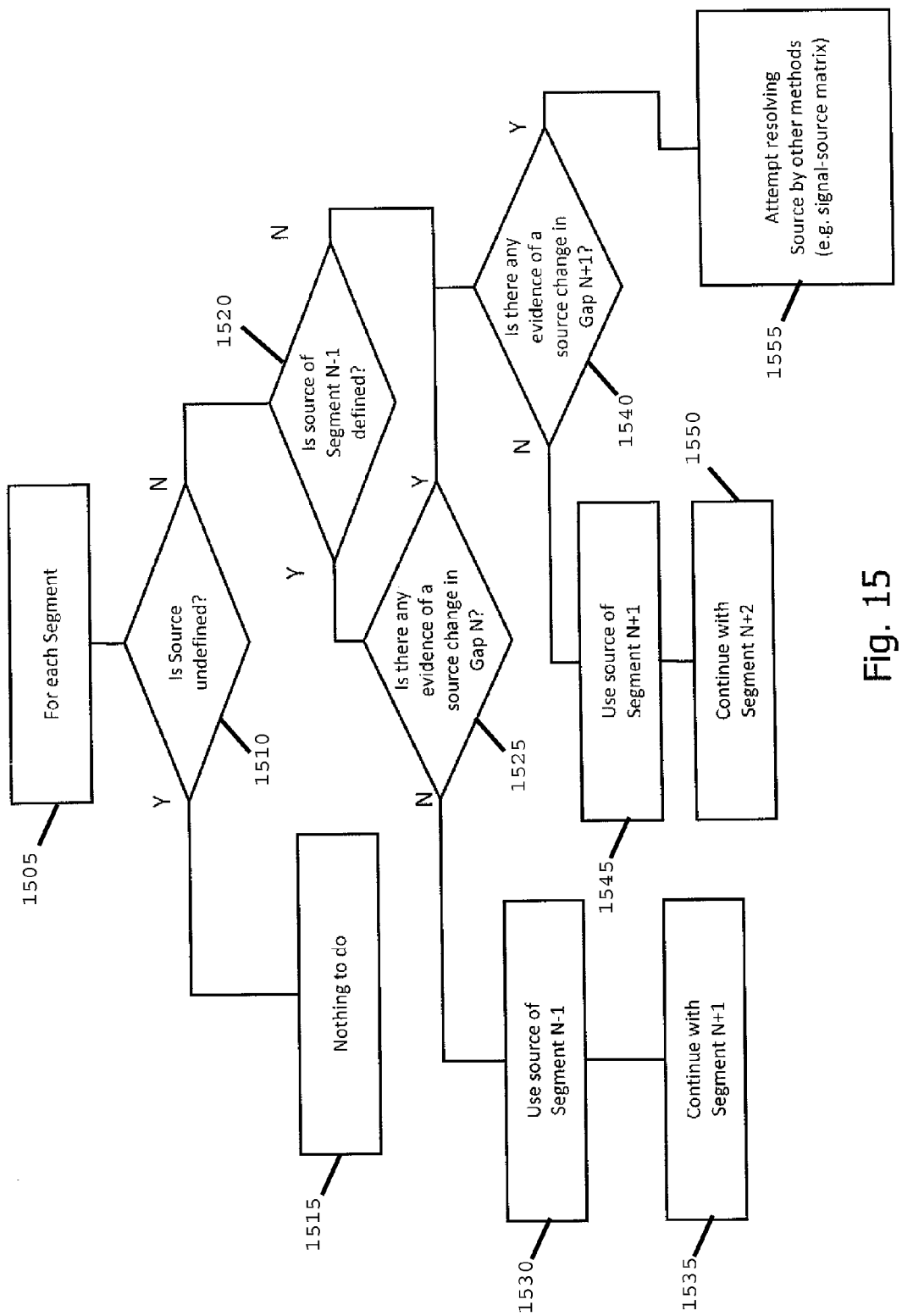
FIG. 15 shows an example flow diagram of a process for defining the source for an exposure segment for which the source remained undefined at the end of the process as set out in FIG. 13.

As will be understood from FIGS. 14 and 15, in those situations in which last leading critical command 156 does not exist in Gap N or was not identified by command identification mechanism 144, no source information may be obtained from the command stream. In those cases, synchronous stream analyzer 145 looks at Gap N to see if there is any evidence of a source change (block 1525). Synchronous stream analyzer 145 does not need to analyze the whole sequence of possible commands to attempt to interpret what the new source may be. Instead, synchronous stream analyzer 145 can determine the likelihood of a source change happening within Gap N according to the user commands found there, which is a simpler task with more repeatable output. For example, identifying even one keystroke corresponding to a source change command may be taken as enough evidence of some source change happening, which is adequate information for processing by the presently described system.

If no evidence of a source change is found in Gap N (block 1525), which is statistically the likely case since source changes are relatively rare as compared to content choices, then it means that whatever the active source was at Segment N−1, must still be valid for Segment N (block 1530). On the other hand, if evidence of a source change is found (block 1525), then no inference can be made from any information provided by Segment N−1. If this is the case, synchronous stream analyzer 145 looks into Segment N+1 and Gap N+1 for more source indications (block 1540). If no evidence of a source change is found at Gap N+1, then synchronous stream analyzer 145 uses any source information associated with Segment N+1 for Segment N, following a similar logic (block 1545). On the other hand, if evidence of a source change does exist in Gap N+1 (block 1540), then synchronous stream analyzer 145 makes no inference about the possible source of Segment N (block 1555). The process is repeated iteratively by synchronous stream analyzer 145 for every segment of the content stream until no further action is possible.

The situation described in the above paragraph, where there are different source indications on both Segment N+1 and Segment N−1 simultaneously, is only possible if Segment N is the only content choice made by users while the unknown active source remains active. Such situation is relatively unlikely in a real world panel, since users tend to change source at a much lower rate than the rate with which they tend to change content choices. In any case, in this last scenario, synchronous stream analyzer 145 can still use information available about the content choice corresponding to Segment N to determine the actual source. For example, synchronous stream analyzer 145 may have access to information about the availability of such content in the different platforms available to the measured TV set and, in many cases, the active device (e.g. source) may be implied by the fact that the chosen content is known to be available in only one platform/device of those available to the TV set under measurement. Therefore, that single possibility is used as source information In this way, synchronous stream analyzer 145 reduces the frequency and potential detrimental effects of having an undefined source for a given exposure segment (e.g., to a statistical minimum), which does not invalidate the usefulness of the method. The system can produce audience data of similar quality compared to that of a conventional system with respect to source identification, although dramatically simplifying the installation and maintenance of metering devices, correspondingly minimizing the associated operating costs.

The above paragraphs describe how the elements described in system 116, as well as their internal workings with respect to input and outputs, produce a benefit in terms of simplicity of installation of metering systems for TV audience measurement. The presently described system and method furthermore can reduce the required computational intensity as compared to conventional techniques while still producing similarly reliable and accurate media consumption data with respect to source identification. The hardware used can be much more compact and, thus, more user friendly as compared to prior art systems. Furthermore, it is readily applicable with existing televisions, computers and peripheral devices and enables additional peripheral devices, such as DVD players, set-top boxes, games console and so on, to be added and used in conjunction with a TV or other media rendering device without having to alter or configure the media source determination methods used as described herein.

The content identification mechanism described above focuses on audio identification but that any suitable content identification mechanism may be used. This may include content matching and/or content watermarking at the broadcast source. For example, video matching techniques may be used to realize content identification mechanism 140, as long as the accuracy requirements mentioned herein above are fulfilled.

The examples described above involve a TV set as the media rendering device, but any suitable media rendering device may be monitored, including a computer, mobile telephone or handheld electronic device which is capable of rendering media from various sources, including the Internet, games applications, TV or radio broadcasting, or from any other suitable sources. Command identification mechanism 144 has been described in relation to an infrared detector in the preferred example, although the same methods realized by synchronous stream analyzer 145 can be applied when dealing with other types of commands, for example keystrokes on a PC keyboard, or any other event generated by user action with the purpose of commanding the operation of a media terminal.

Various alternative programming techniques may be used applying an equivalent rationale as described herein to obtain similar results. That is, the processing performed by synchronous stream analyzer 145 has been described as iterating over segments of a content stream, thereby using a change in content output by a media rendering device, and thus a change in content segment, to look for a corresponding last leading critical user command that was issued at or shortly before the time at which the content change occurred. However, an alternative approach would be to continuously assess the user commands issued with respect to a media rendering device and to iterate over all commands in a stream, testing each one of them for a condition of last leading critical command 156. When a last leading critical command 156 has been identified, this could then be linked to a change in content, and thus a content segment end could be identified, at the same time or shortly after the time at which the last leading critical command 156 was issued. In other words, an equivalent result can be obtained by testing each command of a given stream for the causality condition using the timing considerations described herein with respect to a corresponding content stream or a corresponding list of changes in media variables. However, if there are a number of different source devices associated with a media rendering device there may be a large number of non-critical commands issued with respect to the media rendering device such that this dual equivalent approach may in practice be computationally less efficient than the principle method described herein.

While an example manner of implementing the system 116 has been illustrated in FIGS. 3-5, one or more of the elements, processes and/or devices illustrated in FIGS. 3-5 may be combined, divided, re-arranged, omitted, eliminated and/or implemented in any other way. Further, the example metering device 115, the example content detection mechanism 118, the example audio sensor 120, the example audio input module 121, the example parallel detection mechanism 117, the example infrared sensor 119, the example infrared input processor 122, the example CPU 125, the example RTC 126, the example communication link 127, the example central processing base 128, the example storage facilities 129 and 130, the example content identifier 140, the example user command identifier 144, the example synchronous stream analyzer 145, the example storages 142, 146 and 148, and/or, more generally, the example system 116 of FIGS. 3-5 may be implemented by hardware, software, firmware and/or any combination of hardware, software and/or firmware. Thus, for example, any of the example metering device 115, the example content detection mechanism 118, the example audio sensor 120, the example audio input module 121, the example parallel detection mechanism 117, the example infrared sensor 119, the example infrared input processor 122, the example CPU 125, the example RTC 126, the example communication link 127, the example central processing base 128, the example storage facilities 129 and 130, the example content identifier 140, the example user command identifier 144, the example synchronous stream analyzer 145, the example storages 142, 146 and 148, and/or, more generally, the example system 116 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example system 116, the example metering device 115, the example content detection mechanism 118, the example audio sensor 120, the example audio input module 121, the example parallel detection mechanism 117, the example infrared sensor 119, the example infrared input processor 122, the example CPU 125, the example RTC 126, the example communication link 127, the example central processing base 128, the example storage facilities 129 and 130, the example content identifier 140, the example user command identifier 144, the example synchronous stream analyzer 145, the example storages 142, 146 and/or 148 are hereby expressly defined to include a tangible computer readable medium such as a memory, digital versatile disk (DVD), compact disk (CD), etc., storing such software and/or firmware. Further still, the example system 116 of FIGS. 3-5 may include one or more elements, processes and/or devices in addition to, or instead of, those illustrated in FIGS. 3-5, and/or may include more than one of any or all of the illustrated elements, processes and devices.

The flowcharts of FIGS. 13 and 15 are representative of example machine readable instructions that may be executed to implement the system 116, or one or more portions thereof, as illustrated in FIGS. 3-5. In the example flowcharts of FIGS. 13 and 15, the machine readable instructions represented by each flowchart may comprise one or more programs for execution by a processor, such as the processor 1612 shown in the example processing system 1600 discussed below in connection with FIG. 16. Alternatively, the entire program or programs and/or portions thereof implementing one or more of the processes represented by the flowcharts of FIGS. 13 and 15 could be executed by a device other than the processor 1612 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 13 and 15 may be implemented manually. Further, although the example machine readable instructions are described with reference to the flowcharts illustrated in FIGS. 13 and 15, many other techniques for implementing the example methods and apparatus described herein may alternatively be used. For example, with reference to the flowcharts illustrated in FIGS. 13 and 15, the order of execution of the blocks may be changed, and/or some of the blocks described may be changed, eliminated, combined and/or subdivided into multiple blocks.

As mentioned above, the example processes of FIGS. 13 and 15 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 13 and 15 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 16:
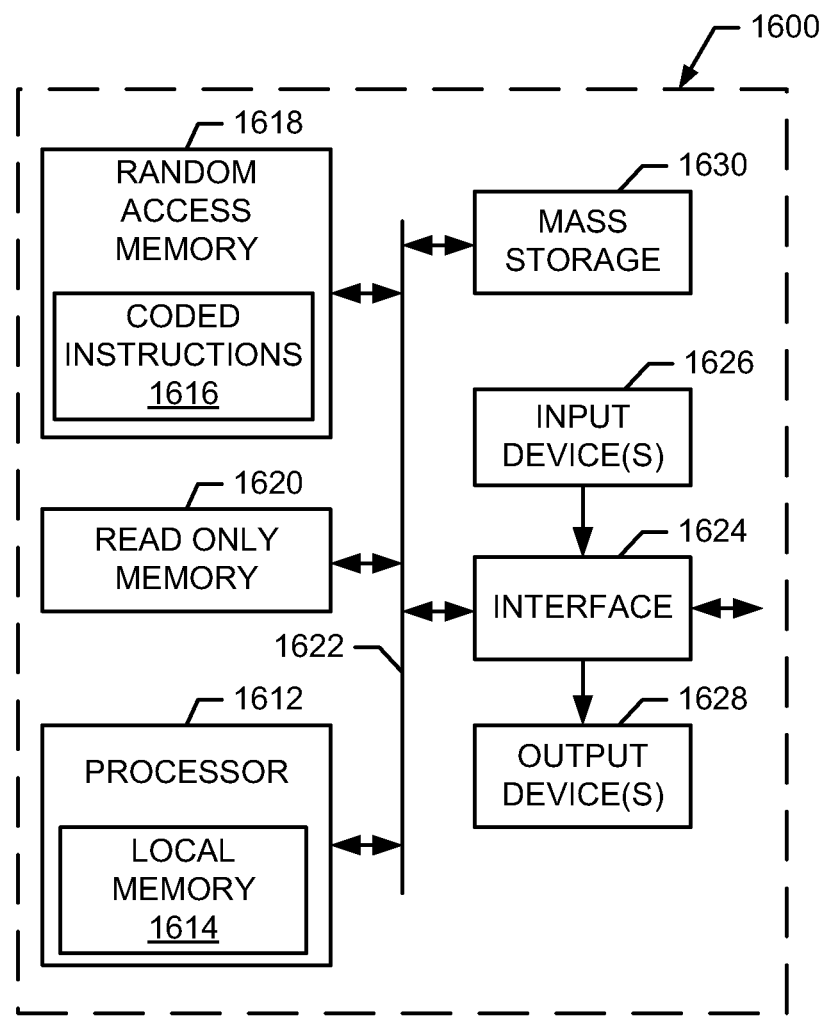
FIG. 16 is a block diagram of an example processing system that may execute the example machine readable instructions of FIGS. 13 and/or 15 to implement the example metering system of FIGS. 3-5.

FIG. 16 is a block diagram of an example processing system 1600 capable of implementing the apparatus and methods disclosed herein. The processing system 1600 can be, for example, a server, a personal computer, a personal digital assistant (PDA), an Internet appliance, a DVD player, a CD player, a digital video recorder, a personal video recorder, a set top box, or any other type of computing device.

The system 1600 of the instant example includes a processor 1612 such as a general purpose programmable processor. The processor 1612 includes a local memory 1614, and executes coded instructions 1616 present in the local memory 1614 and/or in another memory device. The processor 1612 may execute, among other things, the machine readable instructions represented in FIGS. 13 and/or 15. The processor 1612 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1620 may be implemented by flash memory and/or any other desired type of memory device. Access to the main memory 1618, 1620 is typically controlled by a memory controller (not shown).

The processing system 1600 also includes an interface circuit 1624. The interface circuit 1624 may be implemented by any type of interface standard, such as an Ethernet interface, a universal serial bus (USB), and/or a third generation input/output (3GIO) interface.

One or more input devices 1626 are connected to the interface circuit 1624. The input device(s) 1626 permit a user to enter data and commands into the processor 1612. The input device(s) can be implemented by, for example, a keyboard, a mouse, a touchscreen, a track-pad, a trackball, an isopoint and/or a voice recognition system.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, typically includes a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1600 also includes one or more mass storage devices 1630 for storing software and data. Examples of such mass storage devices 1630 include floppy disk drives, hard drive disks, compact disk drives and digital versatile disk (DVD) drives. The mass storage device 1630 may implement storages 129, 130, 142, 146 and/or 148. Alternatively, the volatile memory 1618 may implement storages 129, 130, 142, 146 and/or 148.

As an alternative to implementing the methods and/or apparatus described herein in a system such as the processing system of FIG. 16, the methods and or apparatus described herein may be embedded in a structure such as a processor and/or an ASIC.

This patent claims priority from United Kingdom Patent Application Ser. No. GB0918239.5, entitled, "Audience Measurement System," which was filed on Oct. 16, 2009, and is hereby incorporated by reference in its entirety.

Finally, although certain example methods, apparatus, systems and articles of manufacture have been described herein, the scope of coverage of this patent is not limited thereto. On the contrary, this patent covers all methods, apparatus, systems and articles of manufacture fairly falling within the scope of the appended claims either literally or under the doctrine of equivalents.

What is claimed is:

1. A method of determining source information for media presented by a media rendering device in communication with a plurality of different sources, the method comprising:
   identifying a beginning of a first media segment corresponding to a first detected change in a media variable associated with the media presented by the media rendering device, the media presented by the media rendering device being segmented into a plurality of media segments corresponding to a respective plurality of detected media variable changes;
   obtaining a group of one or more user commands detected within a time interval prior to the beginning of the first media segment; and
   providing the first detected change in the media variable and a first user command selected from the group of one or more user commands to a processor to determine a source of the first media segment.

2. A method as defined in claim 1 further comprising selecting the first user command to be a last user command, within the group of one or more user commands, that was detected immediately before the first detected change in the media variable occurred.

3. A method as defined in claim 1 further comprising identifying to which one of a plurality of devices the first user command has been issued to determine the source of the first media segment.

4. A method as defined in claim 1 further comprising identifying an effect of the first user command on one or more media variables associated with the media presented by the media rendering device to determine the source of the first media segment.

5. A method as defined in claim 1 wherein the first media segment corresponds to a period of time during which a plurality of media variables describing the media presented by the media rendering device are constant.

6. A method as defined in claim 1 wherein the media presented by the media rendering device includes one or more gaps between respective media segments.

7. A method as defined in claim 1 wherein the first detected change in the media variable signifies a change between the first media segment and a preceding second media segment, and the first user command is to be used with the first detected change in the media variable to determine a media source for the first media segment.

8. A method as defined in claim 1 wherein source information for the first media segment is to be determined using source information determined for at least one of a preceding second media segment or a subsequent third media segment associated with the media presented by the media rendering device.

9. A method as defined in claim 1 wherein the media variable associated with the media presented by the media rendering device includes at least one of audio content, visual content, channel number, time-shift indication, or an indication of the source or device from which the media presented by the media rendering device is derived.

10. A method as defined in claim 1 further comprising detecting the media presented by the media rendering device and detecting the group of one or more user commands concurrently.

11. A method as defined in claim 1 further comprising:
    separating the group of one or more user commands into a first group of one or more user commands expected to result in a media source change, and a second group of one or more user commands not expected to results in any media source change; and
    selecting the first user command from the first group of one or more user commands.

12. A metering device to determine source information for media presented by a media rendering device in communication with a plurality of different sources, the metering device comprising:
    a media detector to detect the media presented by the media rendering device, the media being presented having a media variable associated therewith;
    a user command detector to detect a plurality of user commands; and
    a processor to:
        identify a beginning of a first media segment corresponding to a first detected change in the media variable associated with the media presented by the media rendering device, the media presented by the media rendering device being segmented into a plurality of media segments corresponding to a respective plurality of detected media variable changes;
        obtain a group of one or more user commands detected within a time interval prior to the beginning of the first media segment; and
        use the first detected change in the media variable and a first user command selected from the group of one or more user commands to determine a source of the first media segment.

13. A metering device as defined in claim 12 wherein the user command detector comprises at least one of an infrared sensor, an ultrasonic beam sensor or an electromagnetic sensor.

14. A metering device as defined in claim 12 wherein the processor is to select the first user command, within the group of one or more user commands, as a latest user command that was detected immediately before the first detected change in the media variable occurred.

15. An audience measurement system for measuring audiences to media presented by media rendering devices, the system comprising:
    a plurality of metering devices associated with respective media rendering devices, each of the metering devices including:
        a media identifier to identify media segments rendered by a respective one of the media rendering devices, the media identifier to segment the media presented by the respective one of the media rendering devices into successive media segments corresponding to a respective succession of detected media variable changes; and a user command identifier to identify user commands issued by one or more users of the respective one of the media rendering devices; and a processor to:
obtain respective groups of one or more user commands detected within respective time intervals prior to occurrence of the respective media segments; and process the respective groups of one or more user commands to derive source information therefrom.

16. An audience measurement system as defined in claim 15 wherein the processor is to:

identify a first user command causally associated with a first media segment associated with the media presented by the respective one of the media rendering devices; and extract corresponding source information from the first user command.

17. An audience measurement system as defined in claim 15 wherein the first user command is a last leading critical command.

18. An audience measurement system as defined in claim 15 wherein the processor is to identify gaps between respective media segments and to assess a likelihood of a source changing command having been issued within any of the gaps.

19. An audience measurement system as defined in claim 15 wherein the user command identifier comprises at least one of an infrared sensor, an ultrasonic beam sensor or an electromagnetic receiver.

* * * * *